US005916949A

United States Patent [19]

Shapero et al.

[11] Patent Number: 5,916,949
[45] Date of Patent: Jun. 29, 1999

[54] MOLDABLE COMPOSITIONS AND METHOD OF MAKING THE SAME

[75] Inventors: Wallace H. Shapero, Santa Clarita; Susan A. Reyes, Agoura Hills; Gilda C. Alvarez, Harbor City, all of Calif.

[73] Assignee: Mattel, Inc., El Segundo, Calif.

[21] Appl. No.: 08/914,579

[22] Filed: Aug. 18, 1997

[51] Int. Cl.⁶ .................................................. C08K 3/34
[52] U.S. Cl. .................... 524/487; 524/488; 524/451; 523/219
[58] Field of Search ................................ 524/557, 487, 524/488, 451

[56] References Cited

U.S. PATENT DOCUMENTS

| | | |
|---|---|---|
| 2,541,851 | 2/1951 | Wright . |
| 3,061,572 | 10/1962 | Packer . |
| 3,135,648 | 6/1964 | Hawkins . |
| 3,143,518 | 8/1964 | Smith . |
| 3,167,440 | 1/1965 | McVicker et al. . |
| 3,213,051 | 10/1965 | Pink . |
| 3,308,491 | 3/1967 | Spence . |
| 3,353,981 | 11/1967 | Jacob . |
| 3,384,498 | 5/1968 | Ahrabi . |
| 3,402,411 | 9/1968 | Hanson . |
| 3,449,844 | 6/1969 | Spence . |
| 3,456,589 | 7/1969 | Thomison et al. . |
| 3,558,340 | 1/1971 | Spector . |
| 3,565,815 | 2/1971 | Christy . |
| 3,607,332 | 9/1971 | Wingfield . |
| 3,632,786 | 1/1972 | Nickerson . |
| 3,634,280 | 1/1972 | Dean et al. . |
| 3,635,849 | 1/1972 | Hanson . |
| 3,640,741 | 2/1972 | Etes . |
| 3,660,849 | 5/1972 | Jonnes et al. . |
| 3,661,790 | 5/1972 | Dean et al. . |
| 3,663,973 | 5/1972 | Spence . |
| 3,689,948 | 9/1972 | Graves et al. . |
| 3,714,086 | 1/1973 | Schaefer et al. . |
| 3,784,391 | 1/1974 | Kruse et al. . |
| 3,804,654 | 4/1974 | Liu . |
| 3,809,661 | 5/1974 | Shapero et al. . |
| 3,810,265 | 5/1974 | McGrew . |
| 3,853,797 | 12/1974 | Pelzig . |
| 3,858,379 | 1/1975 | Graves et al. . |
| 3,873,485 | 3/1975 | Fichera . |
| 3,886,112 | 5/1975 | Watson et al. . |
| 3,917,781 | 11/1975 | Gabriel et al. . |
| 3,921,801 | 11/1975 | Sway . |
| 3,926,696 | 12/1975 | Klunsch et al. . |
| 3,931,064 | 1/1976 | Ray et al. . |
| 3,946,108 | 3/1976 | Tomlinson et al. . |
| 3,956,040 | 5/1976 | Tezuka . |
| 3,959,197 | 5/1976 | Salyer et al. . |
| 3,961,967 | 6/1976 | Brooks . |
| 3,993,608 | 11/1976 | Wells . |
| 3,996,078 | 12/1976 | Klunsch et al. . |
| 4,005,033 | 1/1977 | Georgeau et al. . |
| 4,019,209 | 4/1977 | Spence . |
| 4,038,762 | 8/1977 | Swan . |
| 4,060,421 | 11/1977 | Yoshikawa et al. . |
| 4,066,745 | 1/1978 | Tomlinson et al. . |
| 4,076,547 | 2/1978 | Lester et al. . |
| 4,076,846 | 2/1978 | Nakatsuka et al. . |
| 4,083,127 | 4/1978 | Hanson . |
| 4,094,694 | 6/1978 | Long . |
| 4,095,008 | 6/1978 | Sundstrom et al. . |
| 4,108,928 | 8/1978 | Swan . |
| 4,144,658 | 3/1979 | Swan . |
| 4,172,054 | 10/1979 | Ogawa et al. . |
| 4,176,079 | 11/1979 | Guerry et al. . |
| 4,211,682 | 7/1980 | Suminoe et al. . |
| 4,223,067 | 9/1980 | Levens . |
| 4,229,546 | 10/1980 | Swan . |
| 4,231,914 | 11/1980 | Born . |

(List continued on next page.)

FOREIGN PATENT DOCUMENTS

| | | |
|---|---|---|
| 1185031 | 2/1985 | Canada . |
| 0 075 934 A1 | 4/1983 | European Pat. Off. . |
| 0 504 016 A1 | 9/1992 | European Pat. Off. . |
| 3042850 | 11/1979 | Germany . |
| 3115746 | 4/1981 | Germany . |
| 3238232 | 4/1984 | Germany . |
| 3641761 A1 | 6/1988 | Germany . |
| 49-115162 | of 1974 | Japan . |
| 51-125446 | of 1976 | Japan . |
| 51-41748 | of 1976 | Japan . |
| 53-63622 | of 1978 | Japan . |
| 04395C/03 | 5/1978 | Japan . |
| 59-36278 | of 1980 | Japan . |
| 617409 | 12/1975 | Russian Federation . |
| 1060-636-A | 7/1981 | Russian Federation . |
| 2214186 | 8/1989 | United Kingdom . |

OTHER PUBLICATIONS

EP Search Report, Application No. EP 92 11 2293 (1992).
"A Composition for Glass Protective Coating" (no other identification).
MSDS for Scotchlite Glass Bubbles (1996).
MSDS for Airvol (1992).
MSDS for Propylene Glycol (1996).
MSDS for Fumed Silica (1985).
MSDS for Guar Gum (1991).
MSDS for Phenonip (1985).
MSDS for Glycerin (1997).
MSDS for Rhodasurf (1991).
MSDS for Multiwax (1994).
MSDS for Parowax (1997).
MSDS for Talc (1997).
MSDS for Penetek (1995).
MSDS for Borax (1993).

*Primary Examiner*—Paul R. Michl
*Attorney, Agent, or Firm*—Kolisch Hartwell Dickinson McCormack & Heuser

[57] ABSTRACT

Compositions and methods of making the same, the compositions including a binder, solvent for the binder, humectant, wax, an emulsifier for the wax, filler, a crosslinking agent for the binder, and various additives. The binder preferably is polyvinyl alcohol. The filler preferably includes glass microspheres, talc and flour. The wax preferably includes paraffin and microcrystalline waxes.

25 Claims, 1 Drawing Sheet

U.S. PATENT DOCUMENTS

| | | |
|---|---|---|
| 4,242,239 | 12/1980 | Kessler et al. . |
| 4,243,754 | 1/1981 | Swan . |
| 4,252,193 | 2/1981 | Powers et al. . |
| 4,255,202 | 3/1981 | Swan . |
| 4,273,827 | 6/1981 | Sweeney et al. . |
| 4,299,231 | 11/1981 | Karmann et al. . |
| 4,299,790 | 11/1981 | Greenberg . |
| 4,303,603 | 12/1981 | Torobin . |
| 4,315,779 | 2/1982 | Heyd et al. . |
| 4,330,634 | 5/1982 | Rodaway . |
| 4,336,071 | 6/1982 | Schnorrer . |
| 4,336,145 | 6/1982 | Briscoe . |
| 4,350,723 | 9/1982 | Sugimura et al. . |
| 4,364,515 | 12/1982 | Prussin . |
| 4,369,284 | 1/1983 | Chen . |
| 4,370,166 | 1/1983 | Powers et al. . |
| 4,386,964 | 6/1983 | Herbert . |
| 4,442,252 | 4/1984 | Sumi et al. . |
| 4,451,584 | 5/1984 | Schaefer . |
| 4,459,375 | 7/1984 | Saeki et al. . |
| 4,459,377 | 7/1984 | Saeki et al. . |
| 4,460,716 | 7/1984 | Saeki et al. . |
| 4,469,837 | 9/1984 | Cattaneo . |
| 4,530,402 | 7/1985 | Smith et al. . |
| 4,537,926 | 8/1985 | Kivel ........................................ 524/388 |
| 4,552,713 | 11/1985 | Cavicchioli . |
| 4,603,158 | 7/1986 | Markham et al. . |
| 4,612,242 | 9/1986 | Vesley et al. . |
| 4,618,213 | 10/1986 | Chen . |
| 4,618,491 | 10/1986 | Kanematu et al. . |
| 4,623,551 | 11/1986 | Giddey et al. . |
| 4,624,976 | 11/1986 | Amano et al. . |
| 4,629,751 | 12/1986 | Montgomery . |
| 4,664,857 | 5/1987 | Nambu . |
| 4,666,771 | 5/1987 | Vesley et al. . |
| 4,668,564 | 5/1987 | Orchard . |
| 4,677,022 | 6/1987 | Dejaiffe . |
| 4,701,329 | 10/1987 | Nelson et al. . |
| 4,713,069 | 12/1987 | Wang et al. . |
| 4,731,389 | 3/1988 | Christopher et al. . |
| 4,734,097 | 3/1988 | Tanabe et al. . |
| 4,735,660 | 4/1988 | Cane . |
| 4,751,246 | 6/1988 | Philion . |
| 4,752,496 | 6/1988 | Fellows et al. . |
| 4,780,491 | 10/1988 | Vesley et al. . |
| 4,784,812 | 11/1988 | Saitoh et al. . |
| 4,801,563 | 1/1989 | White . |
| 4,891,266 | 1/1990 | Keith . |
| 4,950,537 | 8/1990 | Vesley et al. . |
| 4,952,190 | 8/1990 | Tarnoff et al. . |
| 4,956,404 | 9/1990 | Pelzig . |
| 4,972,013 | 11/1990 | Koltisko et al. . |
| 4,980,005 | 12/1990 | Scollard . |
| 5,006,586 | 4/1991 | Touji et al. . |
| 5,080,717 | 1/1992 | Young . |
| 5,100,712 | 3/1992 | Drew et al. . |
| 5,157,063 | 10/1992 | Wetherell . |
| 5,162,138 | 11/1992 | Caflisch et al. . |
| 5,171,766 | 12/1992 | Mariano et al. . |
| 5,203,914 | 4/1993 | Futami et al. . |
| 5,232,494 | 8/1993 | Miller . |
| 5,258,068 | 11/1993 | Shapero et al. . |
| 5,261,952 | 11/1993 | Craig . |
| 5,310,421 | 5/1994 | Shapero et al. . |
| 5,344,681 | 9/1994 | Hanschen et al. . |
| 5,354,597 | 10/1994 | Capik et al. . |
| 5,354,790 | 10/1994 | Keusch et al. . |
| 5,364,892 | 11/1994 | Miller et al. . |
| 5,374,384 | 12/1994 | Berks et al. . |
| 5,383,954 | 1/1995 | Craig . |
| 5,384,345 | 1/1995 | Naton . |
| 5,395,873 | 3/1995 | Mizoule . |
| 5,407,983 | 4/1995 | Naton . |
| 5,412,003 | 5/1995 | Akiyama et al. . |
| 5,429,856 | 7/1995 | Krueger et al. . |
| 5,446,072 | 8/1995 | Mitsukake ................................. 521/54 |
| 5,473,009 | 12/1995 | Kimura et al. . |
| 5,487,778 | 1/1996 | Kaiser . |
| 5,491,180 | 2/1996 | Kiuchi et al. . |
| 5,498,645 | 3/1996 | Mariano et al. . |
| 5,500,287 | 3/1996 | Henderson . |
| 5,501,871 | 3/1996 | Henderson . |
| 5,506,280 | 4/1996 | Miller et al. . |
| 5,506,290 | 4/1996 | Shapero . |
| 5,599,933 | 2/1997 | Kaiser . |

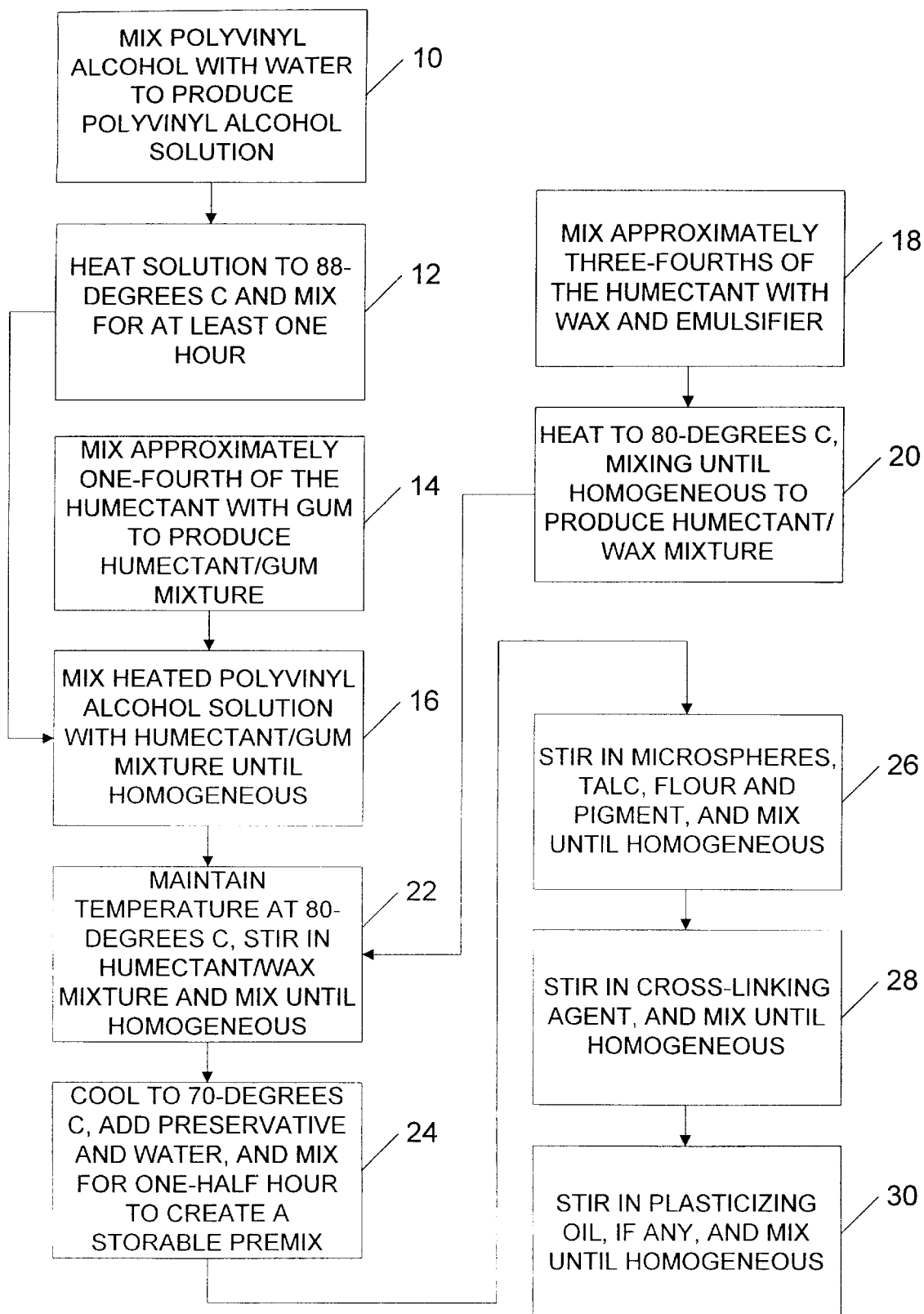

5,916,949

MOLDABLE COMPOSITIONS AND METHOD OF MAKING THE SAME

BACKGROUND AND SUMMARY OF THE INVENTION

Our invention relates generally to moldable compositions and methods of making the same. More specifically, it relates to moldable compositions made from a mixture of polyvinyl alcohol, water, gellant, and filler. The preferred filler uniquely includes a combination of glass microspheres, talc and flour, as described in more detail below. An additional preferred component that is surprisingly compatible with the components of filler is wax, preferably a combination of paraffin wax and microcrystalline wax.

By way of background, U.S. Pat. Nos. 4,629,751, 5,157,063, 5,506,280, and 5,506,290, the disclosures of which are incorporated herein by reference, disclose multiple compositions formed from components that meet the general definitions of polyvinyl alcohol, water, gellant, and filler. It is believed that our compositions offer superior playing, handling and storage properties over any of the compositions disclosed in these patents on account of our unique combination of components and by way of the unique methods defined herein. Our methods also offer significant manufacturing advantages.

Our compositions are particularly well suited to use by children as a tactile toy similar to modeling clay. The compositions are very easy to form and shape, and thus are workable and useable even by very small children. They are stretchable, malleable, joinable, and simply fun to play with. Furthermore, they are non-toxic and washable.

Our compositions also do not dry out, even if left exposed to air for several days, and are easily rehydrated to replace any water lost from prolonged exposure. This is particularly important for compositions that are intended for repeated use by children. If a modeling composition dries out and is not easily rehydrated, it quickly loses the interest of both children and parents, particularly since many children may forget to put it away for several days or more.

Our present invention offers several advantages for the manufacturer. The compositions are easy and safe to formulate and relatively inexpensive to manufacture. All of the component materials are readily available and useable with standard handling and manufacturing equipment.

It is an object of the present invention to provide a moldable composition that is both fun and safe for small children to play with.

It is a further object of the present invention to provide a moldable composition that is easy and relatively inexpensive to manufacture.

Additional objects and advantages of the present invention will be understood more readily after a consideration of the drawing and the Detailed Description of the Preferred Embodiment.

BRIEF DESCRIPTION OF THE DRAWING

The Figure is a flowchart representing the preferred method of making a moldable composition according to present invention.

DETAILED DESCRIPTION OF THE PREFERRED EMBODIMENT

The various components of the moldable compositions of the present invention will be described in conjunction with a description of the method of making the compositions. Accordingly, the reader should refer to the Figure, as needed. Each of the blocks in the Figure represents a step in the method, referred to using the reference indicator in the Figure associated with the step, such as "step 10." To keep the Figure as simple as possible, some sub-steps such as heating and stirring a mixture have been combined into a single step in the Figure and in the following description.

The compositions include generally binder, solvent for the binder, humectant, wax, an emulsifier for the wax, filler, a cross-linking agent for the binder, and various additives. Several of the initial steps of the method are grouped in batches or phases to optimize the quality of the end product, improve the efficiency of the manufacturing process, and reduce the cost of manufacturing the compositions. The method may be performed relatively continuously from start to finish, or it may be paused once a storable premix has been prepared, as discussed below.

The primary binder preferably is polyvinyl alcohol, such as AIRVOL 205, available from Air Products and Chemicals, Inc. Other polyvinyl-based binders may be used, although the results have been found to be less than satisfactory. The preferred solvent is deionized water.

At step 10, the polyvinyl alcohol is mixed with the water to produce a polyvinyl alcohol solution. Preferably, the concentration of polyvinyl alcohol to water is maintained at a relatively high level, approximately 25-percent polyvinyl alcohol. In order to obtain this concentration of polyvinyl alcohol in the polyvinyl alcohol solution, the solution should be heated to approximately 88-degrees C., at step 12. The heated solution should be mixed for at least one hour, also part of step 12.

The humectant preferably includes a combination of propylene glycol and glycerin 99.5% USP. Approximately 30-percent of the propylene glycol, representing approximately one-fourth of the humectant, is mixed with guar gum to produce a humectant/gum mixture at step 14. The guar gum acts as a binder and as a stabilizer. The preferred form of guar gum is available under the designation JAGUAR 8012, available from Rhone-Poulenc. It is believed that other water-soluble gums such as sealing gums, vegetable exudate gums, vegetable seed grain gums (of which guar gum is a member), and vegetable extract gums may be used. A more complete discussion of such gums is found in U.S. Pat. No. 4,548,734, incorporated herein by reference.

The heated polyvinyl alcohol solution from step 12 is mixed with the humectant/gum mixture from step 14 and stirred until homogeneous, at step 16. The humectant/gum mixture, which was not heated, will tend to lower the temperature of the resulting mix, typically to approximately 80-degrees C.

The approximately 70-percent of the propylene glycol that was not used in step 14 is mixed with the glycerin, collectively representing approximately three-fourths of the humectant, and mixed with the wax and emulsifier, at step 18. The wax preferably includes approximately equal portions of a paraffin wax such as PAROWAX 71738-61501, available from Amoco Corporation, and a microcrystalline wax such as MULTIWAX X-145A, available from Petroleum Specialties Group, so that the waxes are present in approximately equal proportions by weight in the composition.

An emulsifier that has been found to work particularly well with this mixture of waxes is polyoxyethylated(20) oleyl alcohol, such as RHODASURF ON-870, available from Rhone-Poulenc. Preferably, the wax comprises at least 10-percent by weight of the final moldable composition, and the emulsifier comprises at least 2-percent by weight of the composition. At step 20, the mixture from step 18 is heated to approximately 80-degrees C., mixing until homogeneous to produce a humectant/wax mixture. It is believed important that the wax be emulsified fully as part of step 20.

The humectant/wax mixture from step 20 then is stirred into the mixture from step 16, and mixed until homogeneous at step 22. At this point in the process, the homogeneous mixture of step 22 may be allowed to cool to 70-degrees C., and a preservative may be stirred in and mixed for one-half hour to create a storable pre-mix at step 24. The preferred preservative is PHENONIP, available from Nipa Laboratories, Inc.

Also as part of step 24, water may be added to replace any water that has been lost in the manufacturing process up to this point. If the production process is to be paused at step 24, the storable pre-mix may be cooled further to approximately 45-degrees C., and placed in an appropriate container for storage.

The preferred fillers of the present composition include microspheres, talc, and flour. The microspheres may be made of various materials, as desired, although borosilicate microspheres have been found to be particularly well-suited to the present composition. As an example of the microspheres, K-35 glass microbubbles, available from 3M, may be used. The microspheres, which tend to decrease significantly the density of the resulting composition, make the composition much more easily formed and extruded, even by small children.

The borosilicate microspheres provide hydrogen bonding with the waxes. The waxes are relatively non-polar materials and therefore are not particularly compatible with the strongly polar mix of the remaining materials. The hydrogen bonding is believed to improve dramatically the retention of the wax in the present composition. Retention of the wax is important, not only when making the composition, but also when using, storing, and shipping the product so that it maintains a consistent texture and feel. The talc also is believed to provide similar hydrogen bonding and, therefore, is particularly important to many embodiments of the present compositions.

The flour preferably is unbleached wheat flour, although other similar fillers such as other grain flours or wood flours may be used. The flour is particularly helpful in giving body to the compositions of the present invention. It is believed that the ability of the flour to absorb water, being approximately three times that of talc, is part of what allows the flour to give body to the compositions.

The microspheres, talc, and flour, along with a pigment or colorant, if desired, are mixed into a selected quantity of the storable pre-mix, at step 26. Pigments that have been found to work well as part of our compositions are part of the DAY-GLO T-SERIES, available from Day-Glo Color, Cleveland, Ohio. The mixture of step 26 then is mixed until homogeneous, after which a cross-linking agent for the polyvinyl alcohol, such as borax, is stirred in, and the mixture once again is mixed until homogeneous to produce a finished product, at step 28. The borax, which may be known more specifically as sodium borate, sodium tetraborate, or disodium tetraborate decahydrate, should not be added earlier than step 28, because it otherwise complicates the manufacturing process, making it particularly difficult to obtain a homogeneous mixture.

The Figure also includes a final, optional step 30 in which a plasticizing oil, such as white mineral oil, may be stirred in to the mix until homogeneous. Preferably, the mineral oil is a very low-density mineral oil such as PENETECK, available from Penreco. The mineral oil facilitates release of the modeling composition from metal items such as mixing bowls and molds. However, it also has an adverse reaction with natural rubbers, found in some plastics, making it very difficult to obtain a release from a rubber-containing mold or product.

A few components not discussed above may be added to alternative embodiments of the invented compositions. For example, sodium carbonate may be added to raise the pH, if needed. However, sodium carbonate, with a pH of 10, may cause the pH of the resulting composition to be too high for safe use by children. Another possible additive is silica, which operates both as a filler and as a thickener. The use of silica is preferred if the microspheres are made from plastic or some other non-silicate material.

We have set forth below in Table 1 what are believed to be suitable ranges of the various components discussed above for numerous embodiments of our invention. These ranges are listed as percentages by weight of the resulting composition. For some materials, such as the microspheres, the density of available microspheres varies dramatically depending on the type of material from which the microspheres are made. Accordingly, the stated ranges are broader for the class of material than they are for the specific type of material.

TABLE 1

| Component | Percentage by weight |
| --- | --- |
| polyvinyl alcohol | 1 to 10 |
| borax | 0.5 to 5 |
| gum | 0.2 to 2 |
| silica | 0 to 10 |
| wax | 8 to 16 |
| emulsifier for the wax | 1.5 to 3 |
| humectant | 10 to 75 |
| microspheres | 3 to 20 |
| talc | 10 to 30 |
| grain or wood flour | 5 to 12 |

The costs of the microspheres can increase dramatically the cost of the resulting composition. Similarly, the flour, which adds body to the composition and is relatively inexpensive, also can make the composition too difficult to extrude. There may be some applications, for instance, pressing the composition into a mold, as opposed to extruding it through an orifice, in which the extra body added by excess flour is a benefit, rather than a drawback.

Set forth below in Table 2 are the approximate percentages by weight of the various components found in one embodiment of the present invention. This embodiment has been found to be a moldable composition that is particularly well-suited for use by young children. It is pleasing to touch, easy to use, and applicable to a wide variety of projects. It also is relatively easy to manufacture using the method described above, and relatively economical to produce.

TABLE 2

| Component | Percentage by weight |
| --- | --- |
| polyvinyl alcohol | 3.9 |
| deionized water | 11.5 |
| borax | 2.8 |
| guar gum | 0.6 |
| paraffin wax | 5.9 |

TABLE 2-continued

| Component | Percentage by weight |
|---|---|
| microcrystalline wax | 5.9 |
| emulsifier for the wax | 2.2 |
| propylene glycol | 20.6 |
| glycerin | 3.5 |
| preservative | 1.2 |
| pigment | 1.5 |
| fragrance | 0.1 |
| borosilicate microspheres | 13.1 |
| talc | 19.5 |
| grain or wood flour | 8.0 |

The composition shown in Table 2 includes fragrance, which is not identified in the method shown in the figure. If desired, fragrance can be added where convenient, preferably as part of step 26. A fragrance that works particularly well is mask oil, such as Bell J-8572, available from Bell Flavor and Fragrance Company, Northbrook, Ill.

The composition shown in Table 2 was produced using the method described above. Specifically, the following parts by weight were added, at the steps indicated in Table 3, below.

TABLE 3

| Component | Step in the Figure | Parts by Weight |
|---|---|---|
| polyvinyl alcohol | Step 10 | 3.50 |
| deionized water | Step 10 | 10.50 |
| propylene glycol | Step 14 | 5.61 |
| guar gum | Step 14 | 0.50 |
| propylene glycol | Step 18 | 13.09 |
| glycerin | Step 18 | 3.15 |
| paraffin wax | Step 18 | 5.39 |
| microcrystalline wax | Step 18 | 5.39 |
| emulsifier for the wax | Step 18 | 2.00 |
| preservative | Step 24 | 1.05 |
| deionized water (make-up) | Step 24 | 6.00 |
| borosilicate microspheres | Step 26 | 11.90 |
| talc | Step 26 | 17.71 |
| grain or wood flour | Step 26 | 7.24 |
| pigment | Step 26 | 1.37 |
| fragrance | Step 26 | 0.08 |
| borax | Step 28 | 2.50 |
| Total Parts in Final Composition: | | 90.98 Including compensation for lost water added in Step 24 |

More specific ranges of components than those listed in Table 1 have been found to produce satisfactory results, although not so preferred as those listed in Table 2. For example, the following ranges of components are within the scope of the present invention.

TABLE 4

| Component | Percentage by weight |
|---|---|
| polyvinyl alcohol | 2 to 6 |
| borax | 1 to 4 |
| gum | 0.3 to 1 |
| wax | 10 to 14 |
| emulsifier for the wax | 1.5 to 3 |
| humectant | 12 to 30 |
| microspheres | 10 to 16 |
| talc | 15 to 23 |
| grain flour | 6 to 10 |

Yet more specifically, the following ranges of the components listed in Table 2 are believed to produce satisfactory results to produce various embodiments of modeling compositions, also within the scope of the present invention.

TABLE 5

| Component | Percentage by weight |
|---|---|
| polyvinyl alcohol | 3 to 5 |
| borax | 2 to 3 |
| guar gum | 0.3 to 1 |
| paraffin wax | 5 to 7 |
| microcrystalline wax | 5 to 7 |
| emulsifier for the wax | 1.5 to 2.5 |
| propylene glycol | 15 to 25 |
| glycerin | 2 to 5 |
| preservative | 0 to 2 |
| pigment | 0 to 2 |
| fragrance | 0 to 1 |
| borosilicate microspheres | 0 to 15 |
| talc | 17 to 22 |
| grain or wood flour | 6 to 10 |

While the present invention has been shown and described by reference to the preferred embodiment, it will be apparent to those skilled in the art that other changes in form and detail may be made therein without departing from the spirit and scope of the invention defined in the appended claims.

We claim:

1. A moldable composition comprising a polyvinyl-based binder, water, microspheres, a cross-linking agent for the polyvinyl-based binder, a humectant, a wax, and talc, wherein the talc comprises from 10-percent to 30-percent by weight of the composition.

2. The moldable composition according to claim 1, further comprising guar gum.

3. The moldable composition according to claim 1, further comprising grain flour.

4. A moldable composition comprising, approximately in the percentages by weight listed:

| polyvinyl alcohol | 3.6 |
|---|---|
| borax | 2.6 |
| guar gum | 0.5 |
| paraffin wax | 5.6 |
| microcrystalline wax | 5.6 |
| emulsifier for the wax | 2.1 |
| propylene glycol | 19 |
| glycerin | 3.3 |
| borosilicate microspheres | 12 |
| talc | 18 |
| grain or wood flour | 7.5 |

5. The moldable composition according to claim 1, wherein the wax comprises microcrystalline wax and paraffin wax.

6. The moldable composition according to claim 5, wherein the microcrystalline wax and the paraffin wax are present in approximately equal proportions by weight.

7. The moldable composition according to claim 1, wherein the wax comprises from 8-percent to 16-percent by weight of the composition.

8. The moldable composition according to claim 7, wherein the microcrystalline wax and the paraffin wax are present in approximately equal proportions by weight.

9. The moldable composition according to claim 8, further comprising an emulsifier for the wax.

10. The moldable composition according to claim 1, further comprising an emulsifier for the wax.

11. A moldable composition comprising polyvinyl alcohol, water, borate, sodium carbonate, microspheres, a wax, and a humectant.

12. The moldable composition according to claim 11, further comprising guar gum.

13. The moldable composition according to claim 11, further comprising talc.

14. The moldable composition according to claim 11, further comprising talc, wherein the talc comprises from 10-percent to 30-percent by weight of the composition.

15. The moldable composition according to claim 11, further comprising grain flour.

16. A moldable composition comprising a polyvinyl-based binder, water, microspheres, a cross-linking agent for the polyvinyl-based binder, a humectant, and wax, wherein the wax comprises at least 10-percent by weight of the composition.

17. The moldable composition according to claim 16, wherein the wax comprises microcrystalline wax and paraffin wax.

18. A moldable composition comprising a polyvinyl-based binder, water, microspheres, a cross-linking agent for the polyvinyl-based binder, a humectant, talc, and wax.

19. The moldable composition according to claim 18, further comprising an emulsifier for the wax.

20. The moldable composition according to claim 18, further comprising flour.

21. The moldable composition according to claim 18, wherein the polyvinyl-based binder is polyvinyl alcohol.

22. The moldable composition according to claim 18, wherein the humectant includes propylene glycol.

23. The moldable composition according to claim 22, wherein the humectant further includes glycerin.

24. A moldable composition comprising, in the ranges of percentages by weight listed:

| | |
|---|---|
| polyvinyl alcohol | 1 to 10 |
| borax | 0.5 to 5 |
| gum | 0.2 to 2 |
| silica | 0 to 10 |
| wax | 8 to 16 |
| emulsifier for the wax | 1.5 to 3 |
| humectant | 10 to 75 |
| microspheres | 3 to 20 |
| talc | 10 to 30 |
| grain or wood flour | 5 to 12 |

25. A moldable composition comprising, in the ranges of percentages by weight listed:

| | |
|---|---|
| polyvinyl alcohol | 1 to 10 |
| borax | 0.5 to 5 |
| gum | 0.2 to 2 |
| wax | 8 to 16 |
| emulsifier for the wax | 1.5 to 3 |
| humectant | 10 to 75 |
| borosilicate microspheres | 7 to 20 |
| talc | 10 to 30 |
| grain or wood flour | 5 to 12 |

* * * * *